United States Patent [19]

Colton et al.

[11] Patent Number: 5,160,674

[45] Date of Patent: Nov. 3, 1992

[54] MICROCELLULAR FOAMS OF SEMI-CRYSTALINE POLYMERIC MATERIALS

[75] Inventors: Jonathan S. Colton, Atlanta, Ga.; Nam P. Suh, Sudbury, Mass.

[73] Assignee: Massachusetts Institute of Technology, Cambridge, Mass.

[21] Appl. No.: 497,821

[22] Filed: Mar. 22, 1990

Related U.S. Application Data

[63] Continuation of Ser. No. 79,251, Jul. 29, 1987, abandoned.

[51] Int. Cl.[5] .............................................. B29C 67/22
[52] U.S. Cl. ...................................... 264/50; 264/51; 264/DIG. 13
[58] Field of Search ................... 264/50, DIG. 13, 51; 521/143, 144

[56] References Cited

U.S. PATENT DOCUMENTS

| | | | |
|---|---|---|---|
| 2,256,483 | 9/1941 | Johnston | 264/50 |
| 2,860,377 | 11/1958 | Bernhardt et al. | 264/50 |
| 3,108,148 | 10/1963 | Coyner | 264/50 |
| 3,227,664 | 1/1966 | Blades et al. | 260/2.5 |
| 3,251,911 | 5/1966 | Hansen | 264/50 |
| 3,507,741 | 4/1970 | Aleixo | 161/175 |
| 3,663,668 | 5/1972 | Fairbanks | 264/50 |
| 3,785,919 | 1/1974 | Hickman | 264/DIG. 13 |
| 3,793,416 | 2/1974 | Finkman et al. | |
| 3,796,779 | 3/1974 | Greenberg | 264/50 |
| 3,808,300 | 4/1974 | Miyamoto | 264/53 |
| 3,891,362 | 6/1975 | Da Vita | 264/50 |
| 3,953,558 | 4/1976 | Hatano et al. | 264/50 |
| 3,975,473 | 8/1976 | Mulvaney | 264/23 |
| 4,042,381 | 5/1978 | Halpern et al. | 264/DIG. 13 |
| 4,092,381 | 5/1978 | Halpern et al. | 264/DIG. 13 |
| 4,211,523 | 7/1980 | Hunerberg | 264/50 |
| 4,260,351 | 4/1981 | Takano et al. | 264/50 |
| 4,264,672 | 4/1981 | Taylor et al. | |
| 4,333,898 | 6/1982 | Schmidtchen | 264/50 |
| 4,649,001 | 3/1987 | Nakamura et al. | 264/50 |
| 4,676,939 | 6/1987 | Kuwabara | |

FOREIGN PATENT DOCUMENTS

| | | |
|---|---|---|
| 41380 | 12/1981 | European Pat. Off. |
| 1504716 | 9/1969 | Fed. Rep. of Germany |
| 1704478 | 5/1971 | Fed. Rep. of Germany |
| 2071992 | 9/1971 | France |
| 58-108328 | 12/1983 | Japan |
| 59-168038 | 9/1984 | Japan |
| 1177428 | 1/1970 | United Kingdom |
| 1196036 | 6/1970 | United Kingdom |
| 1302947 | 1/1973 | United Kingdom |
| 1458866 | 12/1976 | United Kingdom |
| 2140422 | 11/1984 | United Kingdom |

OTHER PUBLICATIONS

Brydson, J. A. *Plastics Materials*, Princeton, N.J., D. Van Nostrand, ©1966, pp. 296-305; 341-349.

*Primary Examiner*—Robert A. Dawson
*Assistant Examiner*—Allan R. Kuhns
*Attorney, Agent, or Firm*—Hamilton, Brook, Smith & Reynolds

[57] ABSTRACT

A method for producing a microcellular foam from a semi-crystalline polymeric material. The material is heated to its melting point at an elevated pressure and then saturated with a uniform concentration of a gas. The pressure is then lowered causing bubble nucleation and growth within the material. The material is then quenched to prevent further foaming. Bubbles on the order of 5 μm in diameter are produced with a bubble density of approximately $10^{10}$ bubbles/cm$^3$.

11 Claims, 1 Drawing Sheet

MICROCELLULAR FOAMS OF SEMI-CRYSTALINE POLYMERIC MATERIALS

This is a continuation of co-pending application Ser. No. 07/079,251 filed on Jul. 29, 1987, now abandoned, the teachings of which are incorporated herein by reference.

BACKGROUND OF THE INVENTION

The ability to process polymers to desired shapes and sizes is one of the properties that makes polymers highly desirable for countless industrial and commercial applications. As with all materials, cost saving methods for processing and utilizing polymers are of key importance. One method for reducing the cost of a polymer article is through the use of blowing agents which produce a foam, thereby reducing the amount of polymer per unit volume. Unfortunately, conventional foamed polymers tend to exhibit a decrease in the mechanical properties.

Microcellular foams have been made in the past by foaming amorphous polymeric materials such as polystyrene. This process involves cell nucleation at or near the glass transition temperature of the polymer material and is more thoroughly described in U.S. Pat. No. 4,473,665 of Martini-Vvendensky, et al. This patent, however, does not teach foaming of semi-crystalline polymers such as polyethylene and polypropylene.

Attempts to produce microcellular foamed articles from semi-crystalline polymers using the method employed for amorphous polymers have proven to be failures. The three basic problems arising when microcellularly foaming semi-crystalline polymers result from the polymers' microstructure. They are as follows:
1) low gas solubility in the crystalline domains,
2) requirement to foam near the melting temperature rather than near the glass transition temperature, and
3) the physical size and structure of the crystals.

Taking the above characteristics of semi-crystalline polymers into account, it is apparent that conventional microcellular foaming techniques will fail to provide a desirable product when used on these polymer types.

SUMMARY OF THE INVENTION

This invention pertains to closed cell microcellular foams of semi-crystalline polymeric materials and a method by which these microcellular foams are produced. More specifically, this invention pertains to a method for producing closed cell microcellular foams from semi-crystalline polymeric materials comprising the steps of:
a) saturating the semi-crystalline polymeric material at an elevated pressure and at a temperature at or above the melting temperature of the material with a uniform concentration of gas;
b) shaping the polymeric material at an elevated pressure to substantially prevent cell nucleation within the material;
c) reducing the pressure to supersaturate the polymeric material with gas and thereby produce a microcellular structure in said material, and
d) lowering the temperature below the melting point of said polymeric material.

The products produced by this process have essentially an infinite number of uses. However, one major use is expected to be in the food service industry. Polypropylene is used heavily in food container applications because it does not impart any flavor to the food contained within it, and because its thermal properties allow it to be filled with hot items. A microcellular foam of this material would be ideal for food service applications due to its savings in raw materials (polypropylene), its insulating ability, its strength and its inertness to flavors.

BRIEF DESCRIPTION OF THE DRAWINGS

The features and advantages of the invention will now be described with more detail in conjunction with the accompanying drawings. These drawings are not necessarily complete in every detail, but instead are intended to illustrate the principles of the invention. For example, the dimensions and specific arrangement of various components of the apparatus may affect parameters of the process, such as the gas/polymer interface. Those skilled in the art will know, or be able to ascertain using no more than routine experimentation, the optimum arrangement of apparatus for each application taking specific materials and operating conditions into account.

DETAILED DESCRIPTION OF THE INVENTION

This invention relates to microcellular foams of semi-crystalline polymers and a method for producing these foams. In its most basic form, the invention involves heating a semi-crystalline polymer to a temperature at or above its melting point. A foaming gas is then supplied to diffuse into the molten polymer. Next, the polymer containing the diffused foaming gas is shaped, through extrusion, injection molding or other forming processes. After being shaped, the polymeric body is subjected to a pressure reduction in the atmosphere surrounding it which triggers the foaming process. Further cell growth is prevented by reducing the temperature to a point below the melting point of the polymeric material. This may be done, for example, by quenching the material with water. Optionally, the pressure can be increased prior to or during the temperature reduction to assist in preventing further cell growth.

Microcellular foam is a polymeric foam with cell sizes smaller than about 100 micrometers ($\mu$m) and ideally in the range of about 5 to about 25 $\mu$m. These void diameters are found to be small enough to enhance or at least maintain the mechanical properties of the parent polymer.

While often referred to as crystalline polymers, materials such as polypropylene and polyethylene exist in states which are either amorphous or semi-crystalline, depending upon the process used to produce them. Ignoring the amorphous state, it is more accurate to term these materials semi-crystalline rather than crystalline since no material is entirely crystalline and free of amorphous domains. The crystalline domain of the material is a region in which the molecules have a regular and ordered arrangement. This may be contrasted to the amorphous domains in which the structure is more random and disordered. Due to the absence of polymers with an absolute crystalline structure, the term semi-crystalline is used here, as in the art, to denote polymeric materials containing crystalline domains.

The glass transition temperature is distinguished from the melting temperature as follows. Glasses are actually supercooled liquids of very high viscosity. The glass transition temperature is that temperature below which free rotations of the polymer molecules cease because of intermolecular forces. In this state, the material is glassy. Above the glass transition temperature, the polymer is rubbery. All polymers have a glass transition temperature. Semi-crystalline polymers also have a melting temperature above the glass transition temperature, above which the crystalline domains dissolve, leaving a fully amorphous material. Above the melting point, these polymers are viscous or viscoelastic materials.

Figure 1:
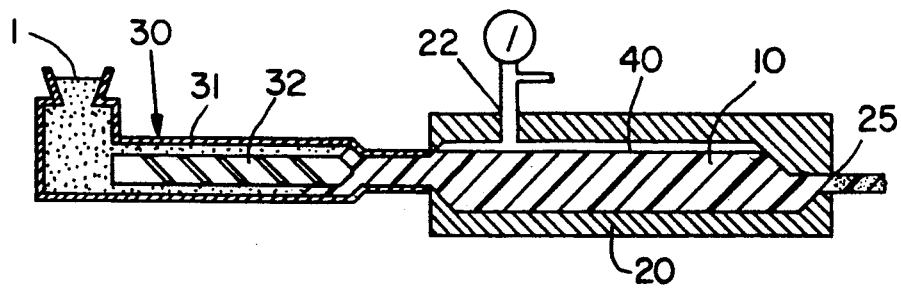
FIG. 1 is a schematic representation of a horizontal extrusion die system used in producing microcellular foam from a semi-crystalline polymeric material.

A schematic representation of a system for forming microcellular foams from crystalline polymers is shown in FIG. 1. An extruder 30, is loaded with polymer pellets 1. These pellets are heated to a temperature above their melting point and forced through the extrusion barrel 31 by a screw 32. The molten polymer 10 is forced by the extrusion screw 32 into a horizontal extrusion die 20. The die contains an aperture 22, through which gas at a high pressure can be pumped to allow interaction between the polymer 10 and the gas at the polymer/gas interface 40. At this interface 40, gas will dissolve into the molten polymer. The polymer 10 then passes out of the die at exit 25, at which point foaming begins due to the reduced pressure on the polymer shape. The material may then be quenched with cold water or other fluids to stop the foaming process. Optionally, the pressure can be increased prior to or during the reduction in temperature to further assist in preventing further cell growth.

Figure 2:
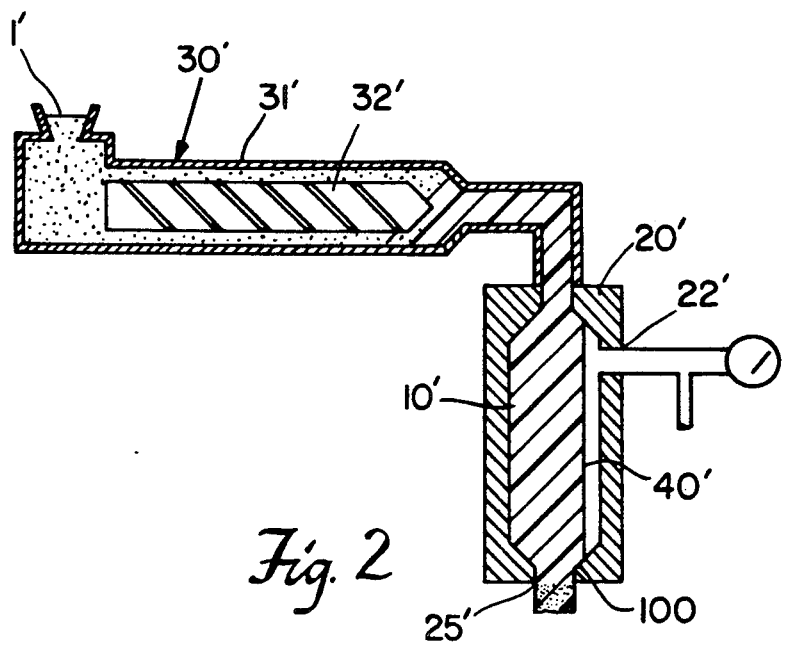
FIG. 2 is a schematic representation of a vertical extrusion die system used in producing a microcellular foam from a semi-crystalline polymeric material.

FIG. 2 is a schematic representation of a system similar to that depicted in FIG. 1; however in FIG. 2 the extrusion die 20' is in a vertical rather than a horizontal orientation. The advantage of this orientation lies at the polymer/die seal 100. This seal prevents the diffusion gas from escaping from the die 20' through the die exit 25'. Gravitational force pulls the melted polymer 10' to the bottom of the die 20' thereby creating the seal 100 at a point anterior to the die exit 25'. This leads to a more uniform gas diffusion within the melted polymer 10'. Otherwise, the operation of the system is similar to that depicted in FIG. 1 and is described as follows.

An extruder 30', is loaded with polymer pellets 1'. These pellets are heated to a temperature above their melting point and forced through the extrusion barrel 31' by a screw 32'. The molten polymer 10' is forced by the extrusion screw 32' into a vertically oriented extrusion die 20'. The die contains an aperture 22', through which gas at a high pressure maybe pumped to allow interaction between the polymer 10' and the gas at the polymer gas interface 40'. At this interface 40', gas will dissolve into the molten polymer. Below this interface is the polymer/die seal 100 discussed previously. The molten polymer 10' then passes out of the die at the die exit 25', at which point foaming begins due to the reduced pressure on the polymer shape. The material may then be quenched with cold water or other fluids or an increase in pressure to stop the foaming process.

Figure 3:
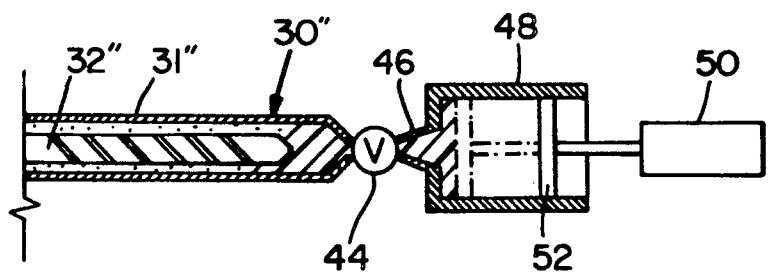
FIG. 3 is a schematic representation of an injection molding apparatus used in producing a microcellular foam from a semi-crystalline polymeric material.

FIG. 3 is a schematic representation of an injection molding system useful for producing microcellular foams from crystalline polymers. The figure illustrates a number of known elements including an extruder 30", extrusion barrel 31", extrusion screw 32", valve 44, nozzle 46, mold 48 and a clamping hydraulic pressure means 50. The pressure in the mold 48 is maintained above the foaming pressure of the gas at melt temperatures for the given initial saturation. When the temperature of the molded part is lowered to the appropriate nucleation temperature, the pressure is dropped and the part is allowed to foam. To keep the melt from nucleating prior to shaping, a pressure substantially equal to that within the extrusion barrel 31" must be maintained within the mold cavity. The pressure can be supplied by a moveable wall 52 under hydraulic pressure for simple part geometries. When the nucleation temperature of the part is achieved the mold 48 is either expanded or cracked to allow the pressure to reach ambient pressure. The part will then expand as the polymer material foams to the final geometry. Many currently existing injection molding machines may be equipped with a moveable wall 52 to allow their use in this process.

Various gases can be used to supersaturate the polymeric material. For example, air, noble gases (such as argon), nitrogen or carbon dioxide can be used. The pressure of the gas on the raw material should be high enough to provide uniform saturation.

Semicrystalline polymers, such as polyethylene and polypropylene, are ideal candidates for foaming due to their low cost and good physical properties.

Satisfactory results have been obtained with gas saturation pressures between approximately 750 psig and 2500 psig for polypropylene. Saturation pressures below 750 psig have been found to result in unevenly saturated samples, resulting in uneven nucleation and bubble growth.

When the material was saturated by nitrogen at a pressure of 1500 psig, the foamed material resulting therefrom was found to contain a bubble density on the order of $10^{10}$ bubbles per cubic centimeter with each bubble of 5 microns in diameter.

Optionally, additives can be employed to enhance cell nucleation. For example, a material such as sodium benzoate can be added to enhance cell nucleation.

SPECIFIC EXAMPLES

Foamed discs of semi-crystalline polymeric material were made by injection molding in the following manner. A 2" diameter, 1/16" thick disc of the material to be foamed was placed in a pressure vessel and heated to a temperature above its melting point. For the materials employed herein, a temperature of approximately 173° C. was found to be satisfactory. The molten material was then saturated with 1500 psig of nitrogen for approximately 30 minutes. The temperature of the material was then lowered and the pressure was released shortly thereafter. The drop in both temperature and pressure caused a spontaneous cell or bubble nucleation and growth within the material and resulted in a foamed part approximately ⅛" thick.

The five following polymers were used with this method: Himont copolymer 7823 (polypropylene with 6.9% by weight ethylene), United States Steel copolymer (polypropylene with 6.9% ethylene), Shell nucleated polypropylene 5524, Shell polypropylene 5384, and Himont 101 polypropylene (with 40% talc by weight).

Microcellular foaming was most successful with the two copolymers. This is likely the effect of two copolymer characteristics: a) a smaller dropoff of the temperature-viscosity relationship near the melting point, and, b) the existence of internal interfaces at which bubbles can nucleate. The Shell nucleation polypropylene also foamed easily due to the large number of nucleation sites contained within the material. The other Shell polypropylene did foam but not as easily as the others because its interfacial energy is not high enough to provide energy for foaming. Finally, the talc-filled Himont was difficult to foam due to the very tight bonding between the talc particles and the polymer which interfered with foaming.

EQUIVALENTS

Those skilled in the art will recognize, or be able to ascertain, using no more than routine experimentation, many equivalents to the specific embodiments of the invention described herein. For example, rather than allowing the foaming gas to diffuse into the polymer melt in the die or injection mold, this can be done in the extrusion barrel during the extrusion process. Such equivalents are intended to be encompassed by the following claims.

We claim:

1. A method of producing a foamed semi-crystalline polymeric material containing uniform closed-cell microcellular voids, comprising the steps, performed in the following sequence, of:
   a) first, heating a semi-crystalline polymeric material to a temperature at or above the melting temperature of the material to thereby melt the polymeric material;
   b) second, saturating the melted polymeric material at an elevated pressure at or above the melting temperature with a uniform concentration of gas;
   c) third, shaping the gas saturated polymeric material in a cavity, mold or die at an elevated pressure to substantially prevent cell nucleation within the material;
   d) fourth, initiating uniform bubble formation in the shaped polymeric material, in the absence of sonic vibrations, by reducing the pressure and supersaturating the shaped polymeric material with gas resulting in a uniform nucleated shaped polymeric material having closed-cell, microcellular voids of below about 100 microns in diameter in said polymeric material; and
   e) fifth, lowering the temperature below the melting point of said polymeric material to prevent further cell growth.

2. The method of claim 1 wherein the step of saturating the material at an elevated pressure further comprises saturating the material at a pressure between approximately 750 psig and 2500 psig.

3. The method of claim 1 wherein the microcellular voids are on the order of about 1 to about 100 microns in diameter.

4. The method of claim 1 wherein the microcellular voids are on the order of about 5 to about 25 microns in diameter.

5. The method of claim 1 wherein the microcellular voids are approximately 10 microns in diameter.

6. The method of claim 1 wherein the step of saturating the material at an elevated pressure with a uniform concentration of gas further comprises saturating the material with a uniform concentration of gas selected from the group consisting of air, noble gases, nitrogen and carbon dioxide.

7. The method of claim 1 wherein the steps of reducing the pressure to a state where the material is supersaturated and lowering the temperature, further comprises the steps of first lowering the temperature and then reducing the pressure.

8. The method of claim 1 wherein the step of shaping the material further comprises shaping the material by die extrusion.

9. The method of claim 1 wherein the step of shaping the material further comprises shaping the material by injection molding.

10. The method of claim 1 wherein the polymeric material is selected from the group consisting of polyethylene, polypropylene and copolymers thereof.

11. A method of producing a foamed semi-crystalline polymeric material containing uniform closed-cell microcellular voids, comprising the steps, performed in the following sequence, of:
    a) first, heating a semi-crystalline polymeric material selected from the group consisting of polyethylene, polypropylene and copolymers thereof, to a temperature at or above the melting temperature of the material to thereby melt the polymeric material;
    b) second, saturating the melted polymeric material with a uniform concentration of gas at an elevated pressure between approximately 750 psig and 2500 psig;
    c) third, shaping the gas saturated polymeric material in a cavity, mold or die at the elevated pressure to substantially prevent cell nucleation within the material;
    d) fourth, initiating uniform bubble formation in the shaped polymeric material, in the absence of sonic vibrations, by reducing the pressure and supersaturating the shaped polymeric material with gas resulting in a uniform nucleated shaped polymeric material having closed-cell, microcellular voids of below about 100 microns in diameter in said polymeric material; and
    e) fifth, lowering the temperature below the melting point of said polymeric material to prevent further cell growth.

* * * * *